United States Patent [19]

Slater et al.

[11] Patent Number: 5,303,751

[45] Date of Patent: Apr. 19, 1994

[54] SPIKED BAG PACKAGING SYSTEM

[75] Inventors: Glenn L. Slater, Ogden, Utah; Pritpal Virdee, New Brunswick, N.J.

[73] Assignee: Fresenius AG, Fed. Rep. of Germany

[21] Appl. No.: 772,086

[22] Filed: Oct. 4, 1991

[51] Int. Cl.$^5$ .......................... B67C 3/00; B65B 1/04; B65B 3/00
[52] U.S. Cl. ................... 141/329; 141/311 A; 141/346; 141/382; 222/80; 222/83.5; 604/905; 604/408; 53/133.1
[58] Field of Search ............ 141/311 A, 312, 329, 141/346, 351, 382, 383, 386; 222/80, 81, 83, 83.5, 88, 89, 93, 94; 604/905, 408, 410, 415; 53/133.2, 133.1, 474, 472; 383/202

[56] References Cited

U.S. PATENT DOCUMENTS

| | | | |
|---|---|---|---|
| 2,704,075 | 3/1955 | Cherkin | 141/329 |
| 3,030,952 | 4/1962 | Elder | 128/214 |
| 3,340,671 | 9/1967 | Loo | 383/202 |
| 3,416,528 | 12/1968 | Kahn | 604/905 |
| 3,822,700 | 7/1974 | Pennington | 222/81 |
| 3,930,286 | 1/1976 | McGowen | 222/83 |
| 3,991,912 | 11/1976 | Soto | 222/81 |
| 4,553,971 | 11/1985 | Ashley | 604/415 |
| 4,576,999 | 2/1986 | Hjertman | 222/81 |
| 4,640,425 | 2/1987 | Cabernoch | 215/11 E |
| 4,798,605 | 1/1989 | Steiner et al. | 604/411 |
| 4,830,205 | 5/1989 | Hammond | 215/11.3 |
| 5,108,702 | 4/1992 | Hübner | 604/411 |

Primary Examiner—Henry J. Reola
Assistant Examiner—Steven O. Douglas
Attorney, Agent, or Firm—Beaton & Swanson

[57] ABSTRACT

A sealed, flexible plastic sheet bag for storing liquids that is penetrable by a spiked connector through a spike channel fitting. The spike channel fitting is sealed between a pair of folds on one side of the bag so that the inside port of the channel is adjacent to the folded plastic sheet. The spike is inserted through the channel of the spike channel fitting and punctures the plastic sheet to tap the bag to remove the liquid. Leakage is prevented by both the seal between the plastic sheet and the spike and the seal between the bag and the spike channel fitting.

31 Claims, 2 Drawing Sheets

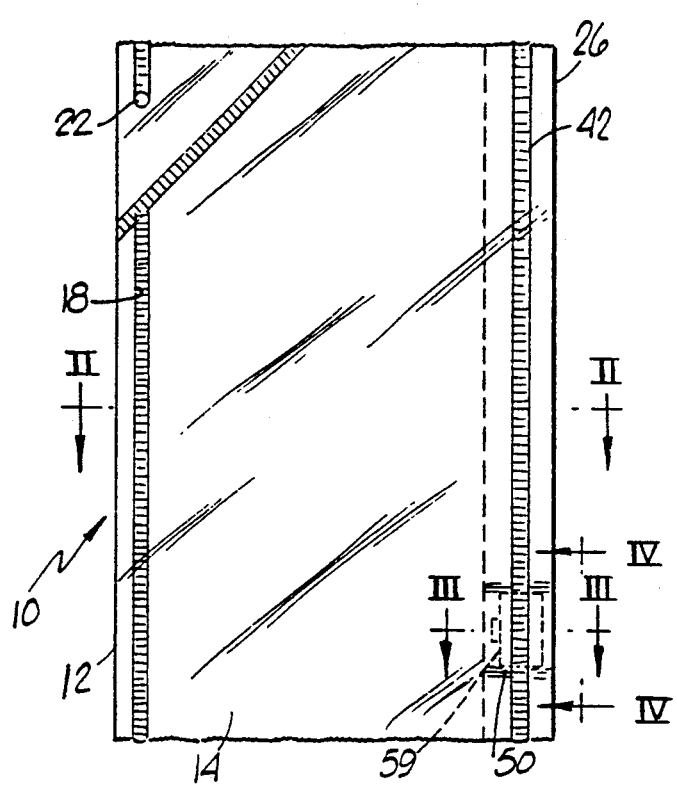
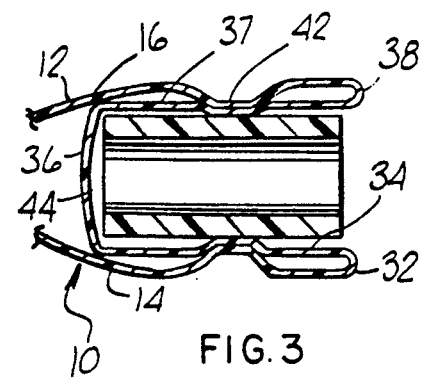
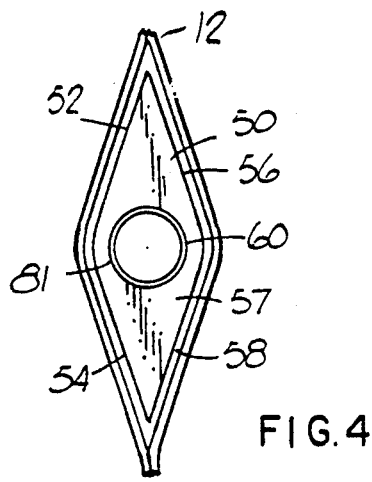
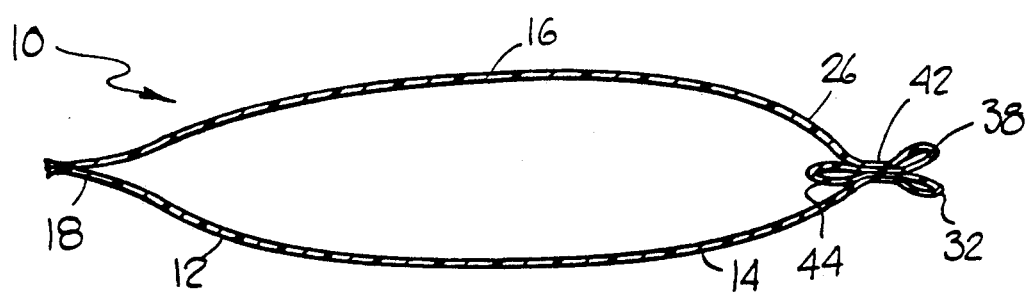
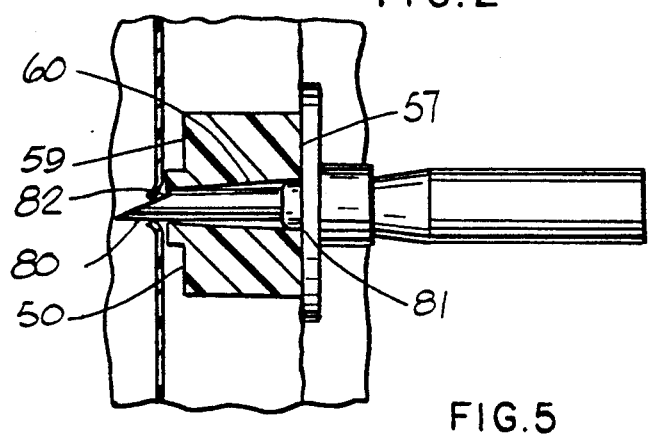

SPIKED BAG PACKAGING SYSTEM

FIELD OF THE INVENTION

The present invention relates to a flexible sealed bag to package liquids. The bag has an attached fitting that is penetrable with a spiked tube. The bag and spike system has particular application to the aseptic packaging of food including liquids for enteral feeding.

BACKGROUND OF THE INVENTION

There is an increasing popularity in liquid packaging systems that utilize a penetrable container and a spiked outlet connector. The container may be of a semi-rigid cardboard or a flexible plastic sheet. The spiked outlet is typically a tap that penetrates and seals against the cardboard or plastic sheet wall of the container. These systems have a wide variety of uses, ranging from the aseptic packaging of ordinary food such as fruit juice, packaging enteral food and packaging pharmaceutical preparations such as fluids for intravenous or peritoneal delivery.

Among the advantages of these systems are their light weight, low cost and simple operation. Further, in the case of the plastic sheet containers, the containers can be transported in an empty and collapsed condition in a very small space and then filled prior to use. After use, the container can again be collapsed and then disposed of in a small space. The plastic sheet containers also lend themselves to sterile packaging using automated fabricating and filling machines that are known in the art.

A principal disadvantage to such systems is the occasional difficulty and expense of obtaining access to the liquid that is packaged in them. Access is typically obtained through a spiked connector that is especially designed for that purpose. The spiked connector may cost more than the container itself. It is usually not reusable, due to concerns of sterility or sanitation. Further, the spiked connector may not always seal perfectly against the wall of the container, thereby allowing the connection to leak. While the seal can be improved using rubber based materials in the container wall, such materials may have insufficient strength or resistance to light degradation or may be difficult to sterilize or to manufacture using heat sealing techniques.

An example of a spiked connector used in tapping semi-rigid aseptic cardboard packages is disclosed in U.S. Pat. No. 4,826,500 by Rautsola for Enternal Nutrient Delivery System. The Rautsola device includes a spike to penetrate the container wall, a liquid passageway through the spike, a make-up air passageway through the spike and a set of threads on the outer circumference of the spike to engage and seal against the container wall. An improvement over this concept is disclosed in U.S. Pat. No. 5,000,349 by Rautsola for Aseptic Package Tap. In the later Rautsola patent, the spike threads as a means for engaging and sealing against the container wall are replaced with a cam arrangement that cooperates with a sleeve that is axially compressible and radially expandable to engage and seal against the punctured hole of the wall. The later Rautsola patent avoids the need to thread the spike into the container. The Rautsola devices are designed primarily for use with semi-rigid cardboard containers, and not for use with flexible plastic sheet containers.

An example of a system for use with flexible plastic sheet container is in U.S. Pat. No. 4,567,999 by Hjertman et al. The Hjertman patent discloses an adhesive fitting that can be attached to the exterior surface of the plastic sheet. A point slidably mounted in the fitting and surrounded by a tubular sleeve pierces the plastic sheet, and then the point is withdrawn while the sleeve remains in the plastic sheet so that liquid can flow through the sleeve. Unless the Hjertman device is adhered perfectly to the sheet, it will leak liquid. Also, the device appears somewhat complicated and expensive to manufacture.

Other devices exist for tapping a flexible plastic sheet container, including U.S. Pat. Nos. 4,640,425 by Cabernoch, U.S. Pat. No. 4,553,971 by Ashley, and 4,830,205 by Hammond. The Cabernoch and Hammond patents are for containers with a sealable gusset to form a pocket to store an attached nursing nipple. The Ashley patent is for a container having a sealable pocket to contain an attached frangible seal that can be pierced by a needle. Each of these devices require a perfect seal between the fitting and the plastic sheet to prevent any leaking.

SUMMARY OF THE INVENTION

The present invention provides for a sealed flexible plastic sheet bag that can be manufactured and filled with ordinary automated machines. The bag is penetrable by a spiked connector that is doubly sealed to the bag to prevent any leakage.

In a preferred embodiment, the container is formed with a gussetted pocket pierceable with the spike. A spike channel is sealed within the outer seal of the gussetted pocket, and the container and spike channel is manufactured and transported as an integral unleakable unit. When ready for use, the spike is inserted through the spike channel and penetrates the wall between the gussetted pocket and the container to allow fluid to flow out of the spike. Leakage is prevented by both the seal between the wall between the gussetted pocket and the container and the spike, and also, in the event that seal is imperfect, the seal between the spike channel and the spike. In order to enhance those seals, the flexible plastic sheet of the container may be of a material known in the art that seals against a penetrating member, and the spike channel may have a channel diameter slightly less than the outside diameter of the spike so that the spike or channel deform against one another. The spike channel may have an exterior configuration in the shape of a wedge or other design that facilitates its placement and sealing within the container.

In another preferred embodiment, the spike channel is adhered to the container exterior surface either during the manufacture of the container or at some time thereafter. The spike channel in this embodiment includes a pierceable outer wall that seals against the outer surface of the spike. The double seal is thus accomplished by the seal between the spike and the container wall and by the seal between the spike channel and the spike.

BRIEF DESCRIPTION OF THE DRAWINGS

FIG. 1 shows an elevational view of a preferred embodiment of the invention.

FIG. 2 is a sectional view taken along line 2—2 of FIG. 1.

FIG. 3 is a sectional view taken along line 3—3 of FIG. 1.

FIG. 4 is an elevational view taken along line 4—4 of FIG. 1.

FIG. 5 is an enlarged view of the spike channel fitting and spike of the present invention.

DETAILED DESCRIPTION OF THE INVENTION

Figure 6:
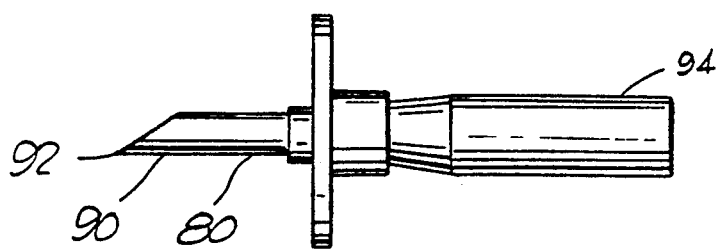
FIG. 6 shows an enlarged view of the spike of the present invention before insertion into the bag.

A preferred embodiment of the invention is shown in FIG. 1. The invention 10 includes a bag 12 having a plastic sheet front side 14 and a plastic sheet back side 16 that are sealed together with a peripheral heat seal 18, adhesive or other appropriate means. The plastic sheets are preferably of a material that seals against a penetrating member such as SCLAIR brand plastic sheet by DuPont. One of the upper corners of the bag 12 has an eyelet 22 heat sealed through the bag from which the bag can be hung by a hook or other suitable means, as further described below.

The side 26 of bag 12 opposite the eyelet 22 is constructed with a set of folds and heat seals to form a gussetted pocket, as shown in the sectional views of FIGS. 2 and 3. As can be seen from those views, the front side 14 plastic sheet extends to the edge of the bag 12, and then folds at a front side fold 32 back toward the center of the bag 12. After extending inward toward the center of the bag 12 a suitable distance (roughly an inch in the preferred embodiment shown) to form a front inner portion 34, it folds again at an inner fold 36 and extends toward the edge of the bag 12 again to form a back inner portion 37. When it reaches the edge of the bag 12 again, it folds yet again at a back side fold 38 back toward the center of the bag 12 where it becomes the back side 16 plastic sheet. Thus it can be seen that a single plastic sheet is folded and refolded to form the front side 14, front inner portion 34, back inner portion 37 and back side 16. The folds occur at a front side fold 32, and inner fold 36 and a back side fold 38. The folded and refolded plastic sheet is heat sealed in substantially a line 42 longitudinally through the front side 14, front inner portion 34, back inner portion 37 and back side 16, such that a pocket 44 is formed which is bounded by the front inner portion 34 on the front, the back inner portion 37 on the back, the inner fold 36 on the side toward the middle of the bag 12, and the heat seal line 42 on the side toward the side of the bag 12.

FIG. 4 is an elevational view taken along line 4—4 of FIG. 1, showing the spike channel fitting 50 sealed into the bag 12. In the preferred embodiment, the spike channel fitting 50 is wedge-shaped element. It has an upper front face 52, a lower front face 54, an upper back face 56, and a lower back face 58. It also has an outer face 57 and an inner face 59 as shown in FIG. 1. The fitting is preferably made of polyethylene. Through the body of the fitting 50 is a spike channel 60 to receive the spike 80 as described below and shown in FIG. 5. The spike channel 60 has a reducing diameter as it extends from an outside port 81 to an inside port 82. The diameter at the outside port 81 is slightly greater than the outer diameter of the spike 80 and the diameter gradually decreases so that the diameter at the inside port 82 is slightly less than the outer diameter of the spike 80. In this manner, the spike channel 60 readily receives the spike 80. As the spike 80 is pushed through the channel 60, however, it reaches a point part way through the channel where it occupies the entire channel. Pushing the spike 80 past that point deforms the spike 80 and channel 60 to create a liquid tight seal between the two. The exact dimensions will vary depending on the materials used in the fitting 50 and spike 80, but in the preferred embodiment in which the fitting is made of polyethene and the spike is made of ABS, it has been found that satisfactory results are obtained with a spike outer diameter of 0.190, a channel outer port 81 diameter of 0.210 and a channel inner port 82 diameter of 0.180.

The wedge shape of the fitting 50 facilitates its attachment to the bag 12. The attachment is made by making the bag folds described above, and then placing the fitting 50 between the front inner portion 34 and back inner portion 37 so that the inner face 59 of the fitting is close to but not necessarily in contact with the inner fold 36 of the set of folds in the plastic sheet. The folded plastic sheet is then heat sealed by the heat seal line 42 in the manner described above, with the fitting 50 in place so that the plastic sheet heat seals directly onto the fitting. This may be done with a special heat seal die that mates with the fitting. The sealed assembly thus includes the fitting 50 with its upper front face 52 and lower front face 54 sealed to the front inner portion 34 of the plastic sheet, and the upper back face 56 and lower back face 58 sealed to the back inner portion 37 of the plastic sheet.

This arrangement results in fitting being disposed so that the spike channel 60 passageway allows the spike 80 between the exterior of the bag 10 and the bag pocket 44. The bag pocket 44 is isolated from the interior of the bag itself. Therefore any liquid that enters the bag pocket 44 from the bag interior cannot reach the bag exterior only through the spike 80 that is engaged with and sealed against the spike channel 60 of the spike channel fitting 50.

The bag is manufactured in accordance with ordinary bag manufacturing procedures, but with the spike channel fitting 50 sealed in place in the manner described above. The manufacturing process may be automated. It may also include the filling of the bag with desired liquid, either under sterile or non-sterile conditions, in an automated or manual process.

To be used, the bag spike 80 is inserted into the channel outer port 81 and through the spike channel 60 of the spike channel fitting 50 as shown in FIG. 5. As the point of the spike 80 passes through the spike channel 60 and past the spike channel inner port 82, the spike and spike channel deform against each other since the inner portion of the channel has a diameter less than the spike diameter. The spike point then exits the channel inner port 82. Continued inward pressure on the spike 80 continues to slide it through the channel 60 until the spike point presses against the plastic sheet at approximately the inner fold 36 between the front inner portion 34 and the back inner portion 37. Still more inward pressure on the spike causes it to continue sliding through the channel 60 to pierce the plastic sheet. The spike is thus disposed so that it extends through the channel 60 and through the plastic sheet of the bag in order to allow liquid to flow out of the bag through the passageway in the spike. As indicated above, the plastic sheet may be of a material that seals against the outer surface of the spike to prevent any liquid from leaking around the spike.

It can be appreciated that this design is exceptionally leak-proof. The bag prior to being spiked is totally sealed with no possibility of leaking. After the spike is inserted through the channel and into the bag, the system is still doubly sealed. First, liquid is prevented from leaking out of the bag along the outer surface of the spike by the seal between the plastic sheet and the spike. Second, any liquid that does leak in that direction is immediately trapped in the pocket 44. It cannot escape from the bag along the exterior surface of the fitting 50 because that exterior surface is heat sealed to the plastic sheet along the heat seal line 42. It cannot escape from the bag along the spike exterior surface because that surface is tightly sealed into the fitting channel 60.

The spike 80 is shown in greater detail in FIG. 6. It generally includes an elongated portion 90 with a sharp point 92 at one end capable of piercing the plastic sheet material of the bag. At the other end is a coupling 94 to couple the spike to tubing (not shown). Extending from near the point 92 through the elongated portion 90 and to the coupling 96 is a liquid passageway.

Figure 7:
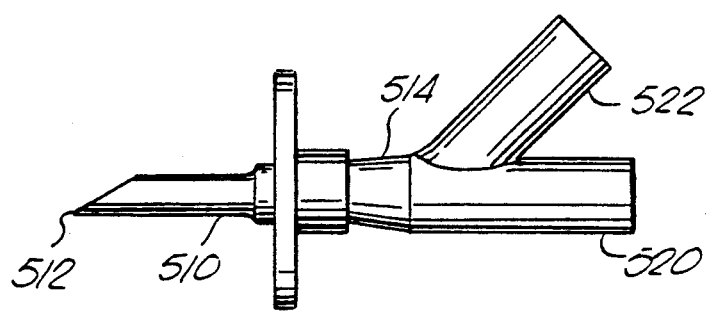
FIG. 7 shows another embodiment of the spike of the present invention before insertion into the bag.

FIG. 7 shows an alternate embodiment of a spike 510. This embodiment has a point 512 and body 514, as in the other embodiment, but has two outlet ports 520 and 522. The first outlet port 520 is for connecting to tubing (not shown) that goes to the patient, while the second outlet port 522 is for connecting to other tubing that goes to another container (not shown). The other container may hold a liquid that is the same as that in the first container for delivery to the patient. Alternatively, the other container may contain an additive liquid to be added to the first container. In this way, the spike allows easy mixing of fluids. Each outlet port 520 and 522 may have one or more plugs which may be on tabs for plugging the outlet when the outlet is not in use.

Figure 8:
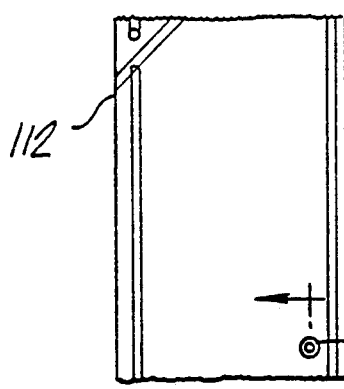
FIG. 8 shows an elevational view of another embodiment of the invention.
Figure 9:
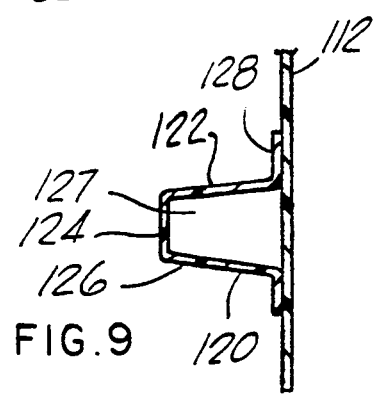
FIG. 9 shows a sectional view taken along line 9—9 of FIG. 8.
Figure 10:
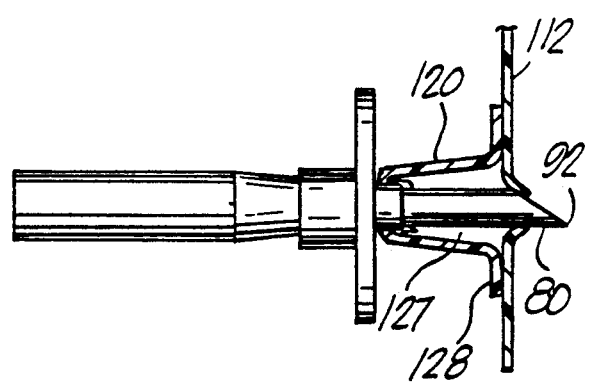
FIG. 10 shows the same elevational view as FIG. 9, but with the spike in place.

Another preferred embodiment is shown in FIGS. 8, 9 and 10. In that embodiment, the entire bag 112 is sealed without the spike channel fitting. The spike channel fitting 120 of this embodiment includes a cup-shaped member 122 having a substantially flat end 124 and a cylindrical side 126 through which extends a channel 127 to receive the spike. Extending around the base of the cylindrical side 126 is an attachment flange 128. The attachment flange 128 has an adhesive side opposite the cup-shaped member 122, which can be adhered to the plastic sheet of the bag. If desired, the adhesive can be preattached to the flange and covered with a peelable cover until ready for use or can be applied to the flange immediately before use.

The flat end 124 of the spike channel fitting 120 is a relatively thin wall that can be pierced by the spike. The dimensions of the wall and the type of material from which the wall is fabricated may be such that the wall seals against the exterior surface of the spike when the spike penetrates the wall.

In operation, the spike channel fitting 120 is adhered to the plastic sheet of the bag 112, preferably proximate one of the lower corners of the bag, by means of the adhesive on the face of the flange 128. The spike 80 is then used to pierce the spike channel fitting end wall 124 and is slid through the channel 127 so that the spike point 92 is against the plastic sheet of the bag 112. The spike is then slid further through the channel so that the spike point 92 pierces the plastic sheet and the spike is driven into the bag interior. The liquid can then flow into the spike through the spike part and through the spike passageway and coupling and into the tubing to which the spike is attached.

As in the other embodiment, this embodiment has two distinct barriers to prevent the liquid from leaking. The first is the seal between the spike elongated portion 90 and the wall of the plastic sheet. Preferably, the plastic sheet is of a material that seals against penetrating members. In the event some liquid does leak past this seal and along the exterior surface of the spike shaft, the liquid will enter the spike channel. It should be contained within that spike channel by the adhesion seal between the spike channel flange 128 and the plastic sheet, and by the seal between the spike shaft exterior surface and the wall of the spike channel fitting end 124.

Figure 11:
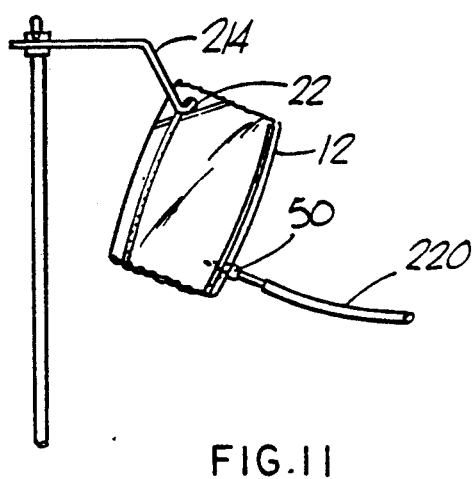
FIG. 11 shows a preferred embodiment of the invention in the hanging position.

The spiked bag system of the present invention is shown in use in FIG. 11. The bag 12 is hung from a stand 214 by the bag eyelet 22. Because the eyelet 22 is in one of the bag upper corners, the bag hangs so that the longitudinal edges are at an angle from vertical. The exact angle will depend on the exact placement of the eyelet and the overall dimensions of the bag, but in general an angle of 20-30 degrees from vertical might be expected for typically dimensioned bags and convenient eyelet placements.

The spike channel fitting 50 is attached near the bag corner diagonally opposite the eyelet 22 so that it is near the low point of the hanging bag. The spike coupling is attached to a tube 220 that extends downward to the patient. As the liquid in the bag drains out of the bag and through the spike and tube and into the patient, the draining fluid causes the bag to collapse gradually. As the bag nears total collapse when the fluid is substantially drained from the bag, the column of liquid in the tube draws out nearly all the rest of the liquid, so that the bag empties virtually completely. The bag is thus left with surprisingly little liquid.

What is claimed is:

1. A liquid packaging device for use with a spike tap, comprising: a flexible bag for containing the liquid, said bag including a wall penetrable by the spike; said bag forming a pocket around said wall so that the interior of said pocket is separated from the interior of said bag by said penetrable wall; and a fitting extending into and attached to the pocket and defining a channel to receive the spike, the channel extending from the exterior of the bag through the fitting to the interior of the pocket for accessing the pocket interior with the spike to pierce said wall.

2. The device of claim 1, wherein the penetrable wall includes a flexible plastic sheet.

3. The device of claim 2, wherein the flexible plastic sheet of the penetrable wall is integral; with a flexible plastic sheet that forms the wall of the bag.

4. The device of claim 3, wherein said flexible plastic sheet is of a material that seals against a penetrating member.

5. The device of claim 4, wherein said flexible plastic sheet is of brand name SCLAIR by DuPont.

6. The device of claim 1, wherein said fitting includes a body attached to the wall of the pocket and a channel through the body extending from the pocket interior to the exterior.

7. The device of claim 6, wherein the fitting body exterior is sealed to the pocket wall.

8. The device of claim 7, wherein the fitting channel has a first diameter at the outer portion of the channel that is larger than the diameter of the spike, to receive the spike, and a second diameter at the inner portion of the channel that is smaller than the diameter of the spike so that the spike seals against the second diameter when the spike is inserted through the channel.

9. The device of claim 8, wherein the channel interior surface slopes gradually from said first diameter to said second diameter.

10. The device of claim 7, wherein said pocket is sealed with a pocket seal joining two opposing pocket plastic sheet sides, and the fitting is disposed between and sealed to said sides.

11. The device of claim 10, wherein the channel has a longitudinal axis and the fitting body has a dimension substantially perpendicular to the channel axis and parallel to the pocket seal that is longer than the dimension substantially perpendicular to the channel axis and perpendicular to the pocket seal, whereby the pocket plastic sheet sides seal smoothly and continuously onto the fitting body.

12. The device of claim 7, wherein a single plastic sheet forms at least part of the bag wall between the bag interior and the exterior and at least part of the bag wall between the pocket interior and exterior.

13. The device of claim 12, wherein said single plastic sheet forms at least part of said penetrable wall between the bag interior and the pocket interior.

14. The device of claim 13, wherein the bag has at least two sides and wherein said single plastic sheet includes a first outer portion forming at least part of the wall between the bag interior and the exterior on a first side of said bag, a first inner portion, a first fold between said inner portion and said first outer portion, a second inner portion, a second fold between said first inner portion and said second inner portion, a second outer portion forming at least part of the wall between the bag interior and the exterior on a second side of said bag, and a third fold between said second inner portion and said second outer portion, and wherein said first outer portion, first inner portion, second inner portion and second outer portion are all substantially parallel and are sealed together along a pocket seal that is spaced apart from the inner fold so that the part of the first inner portion and second inner portion between the inner fold and the pocket seal forms the pocket.

15. The device of claim 14, wherein said fitting body exterior is sealed to said first inner portion and second inner portion at said pocket seal.

16. The device of claim 15, wherein said single plastic sheet forms the entire bag and pocket, and the first inner portion and second inner portion include the penetrable wall between the bag interior and the pocket.

17. The device of claim 1, wherein said bag has a lower corner, and said fitting is attached to the pocket near said lower bag corner, and the bag further includes means for hanging the bag, said means being attached to the upper portion of the bag so that the bag hangs from the hanging means with the lower corner being the lowest point of the bag.

18. The device of claim 1, further including a spike for penetrating said wall between the bag interior and the pocket, the spike having a first port proximate its tip, a second port on an end opposite the tip, and a primary passageway between said ports for liquid flow.

19. The device of claim 18, further including tubing coupled to the spike second port to deliver fluid from the bag to a desired delivery site.

20. The device of claim 19, wherein said spike includes a third port with a secondary passageway in liquid communication with the primary passageway to add or drain liquid.

21. The device of claim 1, wherein said pocket includes a pocket body with a periphery and a flange extending around the periphery, the flange being attached to the penetrable wall to close the pocket.

22. The device of claim 21, wherein said flange is sealingly attached to said penetrable wall by an adhesive.

23. The device of claim 21, wherein said fitting includes a spike penetrable portion on said pocket body.

24. A method of manufacturing a liquid container, comprising folding a set of plastic sheets to form a bag for containing the liquid, one of said sheets having a pierceable section, configuring said sheets to form a pocket around said pierceable section so that the interior of said pocket is separated from the interior of said bag by said pierceable section placing into the pocket a pocket accessing fitting having a channel extending from outside the pocket through the fitting into the pocket for accessing the pocket with a spike to pierce the pierceable section, and sealing together the bag, pocket and access fitting.

25. The method of claim 24, wherein the bag and pocket are formed of a single plastic sheet.

26. The method of claim 25, wherein the folding of the plastic sheet includes establishing a first outer portion, making a first fold to divide the first outer portion from a first inner portion, making a second fold to divide the first inner portion from a second inner portion, and making a third fold to divide the second inner portion from a second outer portion, the first outer portion, first inner portion, second inner portion and second outer portion all being substantially parallel, and wherein said seal extends through all said portions and is spaced apart from the second fold, whereby the pocket is bounded by part of the first inner portion, the second fold, part of the second inner portion and the seal.

27. The method of claim 26, wherein the access fitting is sealed between the first inner portion and second inner portion.

28. The method of claim 27, wherein the channel is proximate the plastic sheet between the pocket and the bag interior, whereby the spike can be inserted through the channel to penetrate the plastic sheet to access the bag interior.

29. A method of delivering liquid to a delivery site, comprising placing a flexible bag containing the liquid adjacent said delivery site, the bag having a wall penetrable by a spike, the bag forming a pocket around said wall such that the interior of the pocket is separated from the interior of the bag by the penetrable wall, and an access fitting extending from outside the pocket into the pocket extending into the attached to the pocket and having a channel extending from outside the packet through the fitting into the packet for accessing the pocket interior with a spike, inserting a spike through said access fitting channel and into the pocket interior and through the penetrable wall into the bag interior, and drawing liquid out of the bag through the spike to the delivery site.

30. The method of claim 29, wherein the penetrable wall seals against the spike and the access fitting seals against the spike, whereby liquid flow from the bag interior into the pocket interior and from the pocket interior to the exterior is impaired.

31. The method of claim 30, wherein said spike is coupled to a delivery tube having an outlet port, and further comprising placing said outlet port lower than the bag so that the weight of the liquid in the bag draws liquid out of the bag and through the tube to substantially drain the bag.

* * * * *

UNITED STATES PATENT AND TRADEMARK OFFICE
CERTIFICATE OF CORRECTION

PATENT NO. : 5,303,751
DATED : April 19, 1994
INVENTOR(S) : Slater, Glenn L. and Virdee, Pritpal It is certified that error appears in the above-indentified patent and that said Letters Patent is hereby corrected as shown below:

Column 8, line 60, delete: "extending from outside the packet into the pocket".

Column 8, line 61, change: "extending into the attached" to "extending into and attached".

Column 8, line 62, change: "packet" to "pocket".

Column 8, line 63, change: "packet" to "pocket".

Signed and Sealed this

Second Day of August, 1994

Attest:

BRUCE LEHMAN

Attesting Officer

Commissioner of Patents and Trademarks